United States Patent
Zhong et al.

(10) Patent No.: US 9,292,613 B2
(45) Date of Patent: Mar. 22, 2016

(54) GENERATION OF GENERIC UNIVERSAL RESOURCE INDICATORS

(75) Inventors: Qiu Zhong, Greenwood Village, CO (US); Na Li, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 474 days.

(21) Appl. No.: 13/149,017

(22) Filed: May 31, 2011

(65) Prior Publication Data

US 2012/0072918 A1    Mar. 22, 2012

Related U.S. Application Data

(60) Provisional application No. 61/384,234, filed on Sep. 17, 2010.

(51) Int. Cl.
  G06F 17/30    (2006.01)
  H04L 29/12    (2006.01)
  H04L 29/08    (2006.01)

(52) U.S. Cl.
  CPC ...... *G06F 17/30887* (2013.01); *H04L 29/0809* (2013.01); *H04L 29/12009* (2013.01)

(58) Field of Classification Search
  CPC .................. G06F 17/30445; G06F 17/30448; G06F 17/30451; G06F 17/30454; G06F 17/30672
  See application file for complete search history.

(56) References Cited

U.S. PATENT DOCUMENTS

| 6,654,741 | B1 * | 11/2003 | Cohen et al. | |
|---|---|---|---|---|
| 7,188,317 | B1 | 3/2007 | Hazel | |
| 7,805,513 | B2 * | 9/2010 | Graveline et al. | 709/225 |
| 2006/0069504 | A1 | 3/2006 | Bradley et al. | |
| 2007/0260705 | A1 * | 11/2007 | Armstrong et al. | 709/217 |
| 2008/0120533 | A1 * | 5/2008 | Lazier et al. | 715/234 |
| 2008/0154864 | A1 * | 6/2008 | Dettinger et al. | 707/3 |
| 2010/0145946 | A1 * | 6/2010 | Conrad | G06F 17/30887 707/736 |
| 2010/0161762 | A1 * | 6/2010 | Saxena | 709/219 |
| 2010/0185611 | A1 * | 7/2010 | Liao et al. | 707/728 |
| 2011/0026700 | A1 | 2/2011 | Clark et al. | |
| 2012/0011392 | A1 * | 1/2012 | Hatasaki et al. | 714/4.11 |

(Continued)

FOREIGN PATENT DOCUMENTS

EP    2355453    8/2011

OTHER PUBLICATIONS

Martin Malin, "An Easy Way to Test Your RewriteRules,", Dec. 2010, martinmelin.se/rewrite-rule-tester/.*

(Continued)

*Primary Examiner* — Jason Mitchell
*Assistant Examiner* — Kevin X Lu
(74) *Attorney, Agent, or Firm* — Kilpatrick Townsend & Stockton LLP

(57) ABSTRACT

Various arrangements for creating and using generic universal resource indicators are presented. To create a generic universal resource indicator, one or more parameters of a universal resource indicator may be identified. An interface that permits a parameter of the one or more parameters to be selected and mapped to a variable may be presented. A selection of the parameter for mapping may be received. An indication of the variable to map to the parameter of the selection may also be received. The generic universal resource indicator having a generic parameter corresponding to the parameter of the selection may be created.

23 Claims, 9 Drawing Sheets

(56) References Cited

U.S. PATENT DOCUMENTS

2012/0072598 A1 3/2012 Zhong et al.
2014/0096046 A1 4/2014 Zhong et al.

OTHER PUBLICATIONS

U.S. Appl. No. 13/149,031, filed May 31, 2011, Non-Final Office Action mailed Mar. 20, 2013, 15 pages.
U.S. Appl. No. 13/149,031, Final Office Action mailed on Sep. 26, 2013, 9 pages.
U.S. Appl. No. 13/149,031, Notice of Allowance mailed on Feb. 20, 2014, 11 pages.
U.S. Appl. No. 13/149,031, Non-Final Office Action mailed on Jan. 23, 2015, 13 pages.
U.S. Appl. No. 13/910,452, Non-Final Office Action mailed on Apr. 10, 2015, 28 pages.

* cited by examiner

GENERATION OF GENERIC UNIVERSAL RESOURCE INDICATORS

CROSS-REFERENCES

This application claims priority from co-pending U.S. Provisional Patent Application No. 61/384,234, filed Sep. 17, 2010, entitled "Related Information Framework with URL," which is hereby incorporated by reference, as if set forth in full in this document, for all purposes. This application is related to co-pending U.S. application Ser. No. 13/149,031, filed May 31, 2011entitled "Use of Generic Universal Resource Indicators,"which is also incorporated by reference, as if set forth in full in this document, for all purposes.

BACKGROUND

A universal resource indicator (URI), which includes a universal resource locator (URL), can be used to identify the name and/or location of a resource (e.g., a webpage) on a network, such as the Internet. In some URI's, besides information regarding the name and location of a resource, one or more parameters are present. When the URI is used to make a request for the resource, values of these parameters may determine one or more attributes of the resource that is provided in response to the request.

SUMMARY

In some embodiments, a method for creating a generic universal resource indicator is presented. The method may include receiving, by a computer system, a universal resource indicator. The universal resource indicator may comprise one or more parameters. The universal resource indicator may be linked with a resource. The method may include identifying, by the computer system, the one or more parameters of the universal resource indicator. The method may include presenting, by the computer system, an interface that permits a parameter of the one or more parameters to be selected and mapped to a variable. The method may include receiving, by the computer system, a selection of the parameter to be mapped. The method may include receiving, by the computer system, an indication of the variable to map to the parameter of the selection. The method may include creating, by the computer system, the generic universal resource indicator having a generic parameter corresponding to the parameter of the selection. The generic parameter may be mapped to the variable.

In some embodiments, one or more attributes of the resource, as accessed using the generic universal resource indicator, vary at least partially based on a value of the variable mapped to the generic universal resource indicator. In some embodiments, the one or more parameters are a plurality of parameters. Further, the method may include creating, by the computer system, the generic universal resource indicator having the parameter of the selection mapped to the variable comprises maintaining as static parameters of the plurality of parameters not indicated by the selection in the generic universal resource indicator. The variable may be linked with a field present in each record of a plurality of records present in a database. The universal resource indicator may be a universal resource locator and the resource is a webpage. The resource may be maintained by a first entity; and the first entity may be separate from a second entity on whose behalf the computer system is operated. In some embodiments, the method may further include receiving, by the computer system, a request to validate the generic universal resource indicator; and validating, by the computer system, the generic universal resource indicator at least in part by determining whether the resource contains a frame breaker. In some embodiments, the method includes receiving, by the computer system, an override, wherein the override triggers the interface to be presented.

In some embodiments, a computer program product residing on a non-transitory processor-readable medium and comprising processor-readable instructions is presented. The instructions may be configured to cause a processor to receive a universal resource indicator. The universal resource indicator may comprise one or more parameters. The universal resource indicator may be linked with a resource. The instructions may be configured to cause the processor to identify the one or more parameters of the universal resource indicator. The instructions may be configured to cause the processor to cause an interface to be displayed that permits a parameter of the one or more parameters to be selected and mapped to a variable. The instructions may be configured to cause the processor to cause a selection to be received of the parameter to be mapped. The instructions may be configured to cause the processor to cause an indication to be received of the variable to map to the parameter of the selection. The instructions may also be configured to cause the processor to create a generic universal resource indicator having a generic parameter corresponding to the parameter of the selection, wherein the generic parameter is mapped to the variable.

In some embodiments, a system for creating a generic universal resource indicator is presented. The system may include a processor. The system may also include a memory communicatively coupled with and readable by the processor. The memory may have stored therein a series of instructions which, when executed by the processor, cause the processor to receive a universal resource indicator. The universal resource indicator comprises one or more parameters. The universal resource indicator may be linked with a resource. The instructions may also cause the processor to identify the one or more parameters of the universal resource indicator. The instructions may also cause the processor to cause an interface to be displayed that permits a parameter of the one or more parameters to be selected and mapped to a variable. The instructions may also cause the processor to cause a selection to be received of the parameter to be mapped. The instructions may also cause the processor to cause an indication to be received of the variable to map to the parameter of the selection. The instructions may also cause the processor to create the generic universal resource indicator having a generic parameter corresponding to the parameter of the selection, wherein the generic parameter is mapped to the variable.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
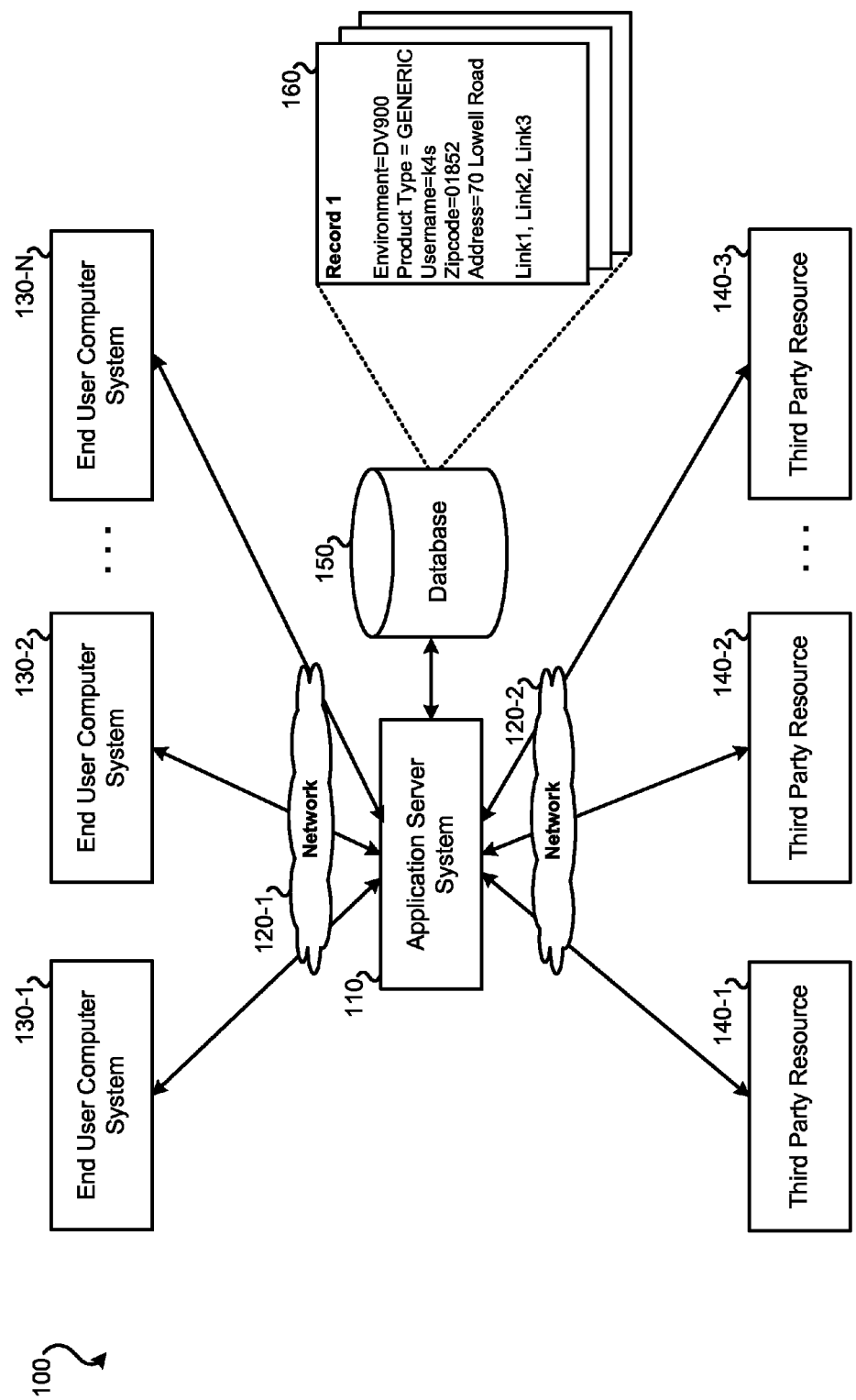
FIG. 1 illustrates an embodiment of a system for creating and using a generic universal resource indicator.

When a URI is used to make a request for a resource, such as a webpage, the URI may contain one or more parameters that determine one or more attributes of the resource that is provided in response to the request. By modifying the values of one or more of these parameters contained in the URI, one or more attributes of the resource received in response to the URI may be varied.

For example, a particular website may provide geographic maps (for this example, a fictional website called "map.com" will be used). To display a map of a particular region a user may go to map.com and provide a zip code. This may result in a particular webpage being provided to the user's computer and displayed. The universal resource indicator for the map of this zip code may appear as: "http://map.com/maps?f=q&source=s_q&hl=en-&geocode=&q=80111&ie=UTF&t=h." Characters following "maps" in this URL may be various parameters that identify attributes that affect how the webpage is presented to the user. Parameter "q" is linked to a zip code (in this example, 80111). By resubmitting the same universal resource indicator with parameter "q" modified to have a value of a different zip code may result in the web page returned having different attributes (such as the map being centered on the different zip code).

By modifying parameters present in the universal resource indicator, the attributes of the resource retrieved may be contextualized based on the modified parameters. This property of some universal resource indicators may be exploited by creating a generic universal resource indicator having generic parameters linked with variables. For example, a database may contain thousands of records. These records may contain addresses of various business contacts. Returning to the previous example, the "q" parameter of the universal resource indicator may be modified, which may result in a map centered on the zip code inserted in the "q" parameter being retrieved. When each record of the database is loaded, a universal resource indicator may be created that substitutes a zip code from the loaded record for the value of the "q" parameter in a generic universal resource indicator. This universal resource indicator that is specific to the loaded record may then be requested and the contextualized resource may be loaded. In this example, the map retrieved may focus on the zip code present in the loaded record. As such, for each record from the database loaded, a generic universal resource indicator may be used to create a URI specific to the currently loaded (e.g., displayed) record. This specific URI may be used to retrieve the resource having modified attributes according to the parameters modified in accordance with the currently loaded record.

While the above example details the use of a URI tied to a website that provides maps, it should be understood that this is intended only as an example. Similar principles may be applied to other resources that use URI's containing parameters. For instance, some shipping websites use URI's that contain parameters. Further, the use of a generic URI may be used in conjunction with records present in a database as detailed above. However, generic URI's may also be used in conjunction with other software and systems.

As another example, rather than varying parameters of a URL, portions of the URL (such as the domain name or IP address) may be varied. For example, if a database record is linked with a distributor of a corporation, an URL may be created that links to the corporation based on a database record containing the database's name (e.g., a record listing "Example Corp." could link to www.example.com). As such, in an URL, a domain name may be treated similarly to the parameters discussed herein.

FIG. 1 illustrates an embodiment of a system 100 for creating and using a generic universal resource indicators. System 100 may include application server system 110, network(s) 120, end user computer systems 130, third party resources 140, and database 150, which may contain records, such as record 160. Application server system 110 may be a computer system, such as computer system 900 of FIG. 9, that hosts one or more applications for end user computer system 130. Application server system 110 may host enterprise resource planning (ERP) software. For example, application server system 110 may host ERP software such as JD EDWARDS ENTERPRISEONE by ORACLE. Application server system 110 may host other types of software for end user computer systems 130 also. Application server system 110 may use generic universal resource indicators as discussed generally above and in greater detail below.

Application server system 110 may be in communication with one or more end user computer systems 130 via network 120-1. Network 120-1 may represent a public network, such as the Internet, a private network, such as a corporate local area network, or some combination thereof. Network 120-1 may also include one or more wireless networks, such as a wireless network of a cellular service provider.

End user computer systems 130 may each represent a computer system operated by an end user that utilizes software available at the application server system. Each of end user computer systems 130 may be represented by computer system 900 of FIG. 9. If application server system 110 executed ERP software, an end user may use an end user computer system, such as end user computer system 130-1, to interact with the ERP software. In some embodiments, application server system 110 and end user computer system 130 represent the same computer system. As such, an end user may directly interact with the computer system hosting the software with which the end user desires to interact, such as ERP software. While FIG. 1 illustrates three end user computer systems 130 as being present, it should be understood that this is for illustration purposes only. While fewer end user computer systems may be present, such as one or two, in some embodiments tens, hundreds, or even possibly thousands of additional end user computer systems may communicate with application server system 110.

Application server system 110 may also communicate with various third party resources 140. Communication between application server system 110 and third party resources 140 may use network 120-2. Network 120-2 may represent the same or a different network from network 120-1. Network 120-2 may include one or more private networks, such as a corporate local area network, one or more public networks, such as the Internet, and/or one or more wireless networks such as a cellular service provider's network.

Third party resources 140 may represent websites. Third party resources 140 may also represent other forms of resources available remotely via network 120-2, such as newsgroups and/or file transfer protocol (ftp) sites. Third party resources 140 may also be accessed directly by end user computer systems 130. Third party resources 140 may represent resources that operated on behalf of an entity separate from the entity on whose behalf application server system 110 is operated. For example, third party resource 140-1 may represent a commercial website, such as that of a search company, a shipping company, a map provider, etc. Third party resources 140 may each be a computer system, such as computer system 900 of FIG. 9. While FIG. 1 illustrates three third party resources 140 as being present, it should be understood that this is for illustration purposes only. While fewer third party resources may be present, such as one or two in some embodiments, tens, hundreds, or even possibly thousands of additional third party resources may communicate with application server system 110.

If an end user computer system, such as end user computer system 130-1 attempts to communicate with a third party resource, such as third party resource 140-1, end user computer system 130-1 may use network 120-1 to route a request to third party resource 140-1 via application server system 110 and network 120-1. In some embodiments, end user computer system 130-1 may communicate with third party resource 140-1 via a network, such as network 120-1.

Application server system 110 may be in communication with one or more databases, such as database 150. Database 150 is illustrated as local to application server system 110 (not requiring communication via a network); however, it should be understood that database 150 or some other databases may be accessed by application server system 110 via a network, such as network 120-1. Database 150 may contain various records. As an example, records within database 150 may be information for an electronic contact list. If application server system 110 hosts ERP software, database 150 may contain information such as orders and/or inventory of the entity that operates application server system 110.

For an electronic contact list, various records, such as record 160 may be present. While only record 160 is illustrated in FIG. 1, it should be understood that tens, hundreds, or thousands of records may be present. Record 160 contains various pieces of information related to a particular entity. In record 160, username "k4s" is linked with a zip code (01852) and an address (70 Lowell Road). This record also contains three links (link1, link2, and link3).

These links may be links specifically tailored to record 160. For instance, a generic universal resource indicator may be created by a computer system, such as application server system 110 or one of end user computer systems 130 that is designed to access a third party resource. A generic URI may be used to create a URI that is specific to record 160. As such, when the specific URI is used to access the third party resource, the resource returned to the end user, such as a webpage, may be contextualized for the record 160. As an example, a field, such as "Zipcode=01852" of record 160 may be used in conjunction with a generic URI to create a link to a map focused on zip code 01852.

Universal resource indicators, which can contain universal resource locators (URLs), commonly referred to as web addresses, may contain various contextual parameters, referred to as parameters for short. These parameters, when edited, may not affect which resource the URI points to, but may affect attributes of the resource as returned to the computer system requesting the resource. Parameters may include subpaths: for example, referring to the exemplary link "http://ww.sample.com/Colorado/Denver," "Colorado" and "Denver" may be parameters. Parameters may include various values: for example, referring to the exemplary link "http://www.sample.com/search? state=MA&city=Lowell," the parameters may be state and city, having values of "MA" and "Lowell," respectively. Parameters may include prefixes and/or postfixes of a filename: for example, referring to the exemplary link "http://ww.sample.com/zipcode/01002.html," "01002" and "html" are parameters. Other forms of parameters may also be possible.

Using the above URI as an example, if the parameter "01002" is altered to "01852," the resource returned may be modified, such as a map illustrating the region covered by the latter zip code rather than the former. As such, a URI, such as "http://www.sample.com/-zipcode/01002.html" can be used to create a generic URI, wherein "01002" is substituted with a generic parameter (e.g., a placeholder). This generic parameter may be linked with a variable that varies depending on a record (or other set of information) being accessed by a user. As such, a URI may be created for each record in a database based on information present within each record. Again returning to the example of a zip code, if each record is linked with an address, the zip code of the address may be used in conjunction with a generic URI to create a URI specific to the record. As such, for example, when the record is loaded, the URI created specific to the record may be requested and a resource contextualized to the record may be retrieved, such as from a third party resource of third party resources 140 of FIG. 1.

Figure 2:
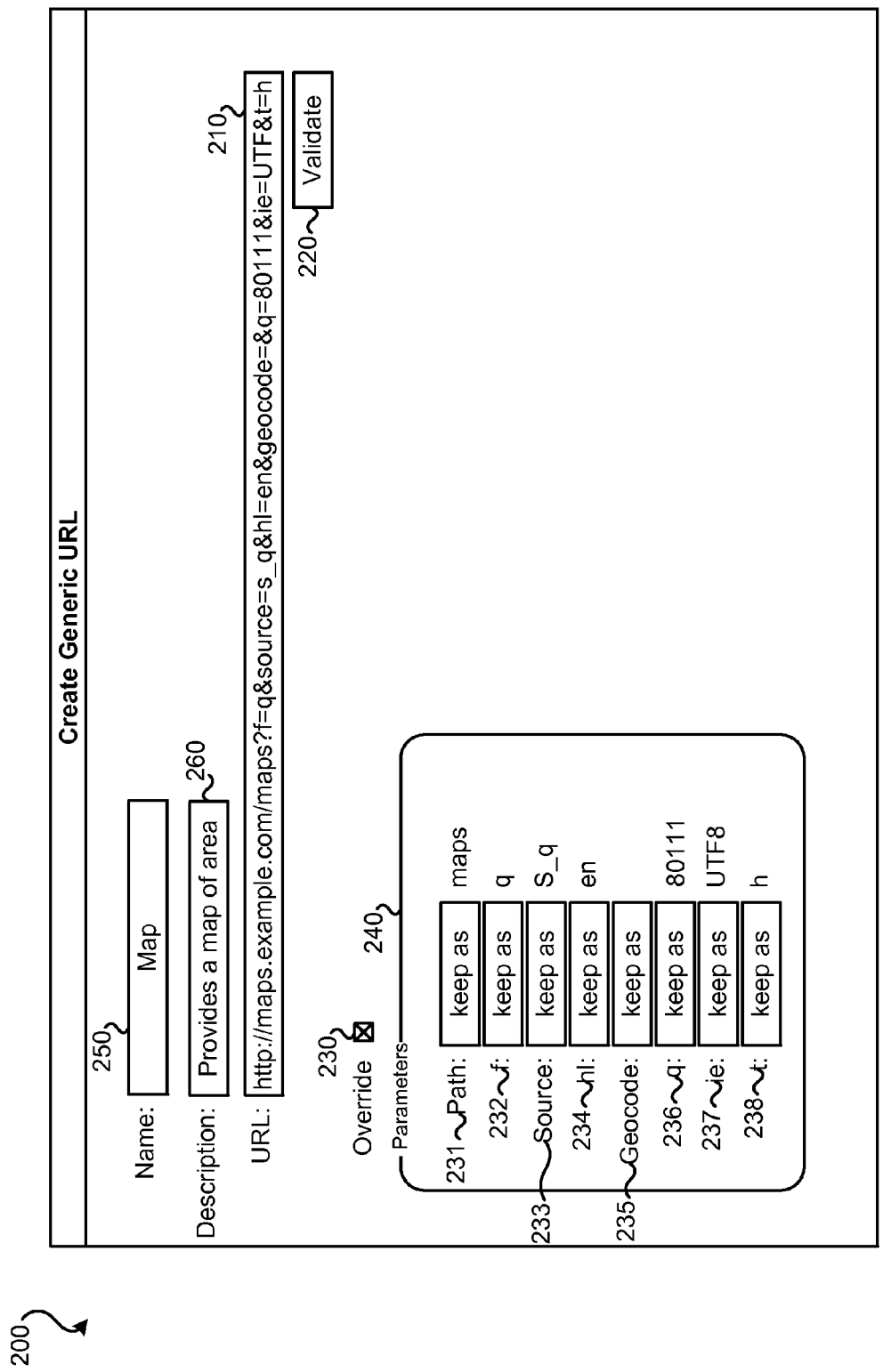
FIG. 2 illustrates an embodiment of an interface for creating a generic universal resource indicator.

FIG. 2 illustrates an embodiment of an interface 200 for creating a generic universal resource indicator. An end user or administrator, via a computer system, such as an end user computer system of end user computer systems 130 or application server system 110 of FIG. 1, may be presented with interface 200. For example, interface 200 may be a web-based interface that is hosted by application server system 110 and presented to an end user or administrator (or some other form of user) via an end user computer system of end user computer system 130. A user may desire a generic URI, such as a URL, be created from a URI which may be provided in link input 210 of FIG. 2: "http://maps.example.com/maps?f-=q&source=s_q&hl=en&geocode=&q=80111&ie=UTF&t=h." The URL present in link input 210 contains several parameters. Following a user providing a URL (or URI) into link input 210, validate input 220 may be selected. This may validate the resource identified by the URL. Validating the URL may include loading the URL such that the resource identified by the URL is presented to the user. In some embodiments, the loaded resource is not displayed to the user. In some embodiments, it is determined whether a frame breaker is present in the code of the resource linked to the URL. If so, the URL may not be able to be displayed in a frame. This may render the resource ineligible for certain uses (such as being displayed in a portion of a web browser while other information, such as an ERP software interface, is displayed in the remainder.

The parameters present in the URL provided to link input 210 may be identified. These parameters may be displayed to the user in parameters region 240. If a user desires to create a generic URL from the URL provided in link input 210, the user may select override 230. Selecting override 230 may permit the user to view and/or modify parameters of the provided URL. In the embodiment of FIG. 2, the URL has the following parameters: path 231, "f" 232, source 233, "hl" 234, geocode 235, "q" 236, "ie" 237, and "t" 238. A user may have the opportunity to modify one or more of these parameters for the generic URI. Parameters may be kept as the corresponding value present in the URL provided in link input 210. For example, referring to parameter "q" 236, the user may determine that this parameter is linked to a zip code that affects what map (or what portion of the same map) is returned when the resource is requested. As such, the user may wish to link this parameter to some variable, such that as the variable changes, one or more attributes of the resource, as requested, changes.

In the example of interface 200, the URL provided by the user to link input 210 is a link to a map provided by a third party resource of the area of zip code 80111. The user may desire to create a generic URL that modifies the "q" 236 (the zip code) parameter such that the generic URL can be used to generate an URL that loads a map of other zip codes depending on the value of the variable. In name input 250, the user may provide a name to link with the generic URL. In description input 260, the user may provide a description to link with the generic URL.

It should be understood that the URL, parameters, and the parameter(s) desired to be modified by the user are for example purposes only. The parameters presented to the user via parameters region 240 may vary based on the URL provided in link input 210.

Figure 3:
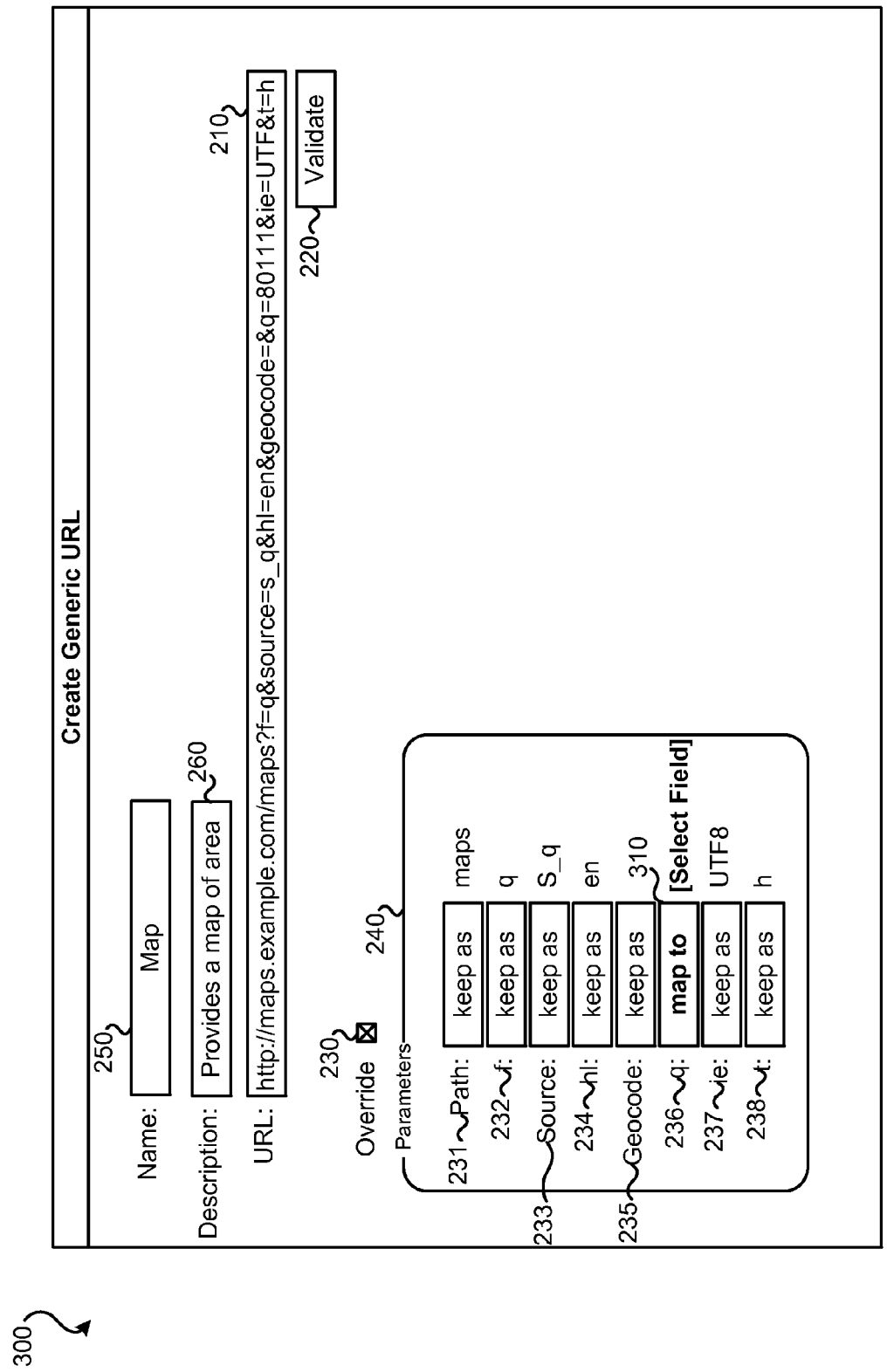
FIG. 3 illustrates another embodiment of an interface for creating a generic universal resource indicator.

FIG. 3 illustrates another embodiment of an interface 300 for creating a generic universal resource indicator. Interface 300 represents interface 200 following the user selecting to modify parameter "q" 236. The user may use modification selector 310 to indicate that the user desires to use a value other than the original value present in the URL provided in link input 210. Modification selector 310 may have several options: "keep as," "map to," and "set to" are three possible options.

If modification selector 310 is set to "keep as" this may mean that the value of the parameter is maintained from the originally supplied URL provided in link input 210. If modification selector 310 is set to "set to," a constant value may be provided by the user that is used in the generic URL. If modification selector 310 is set to "map to," the user may select or provide a variable that the parameter is mapped to. For example, in the instance of a database, the variable may be a particular field present in some or all of the records of the database. In interface 300, after setting modification selector 310 to "map to," the user may be prompted to select a field that the parameter is to be linked to.

It should be understood that the language of "keep as," "set to," and "map to" is intended to be exemplary. Other language (or symbols) can be used to provide a user with similar options.

Figure 4:
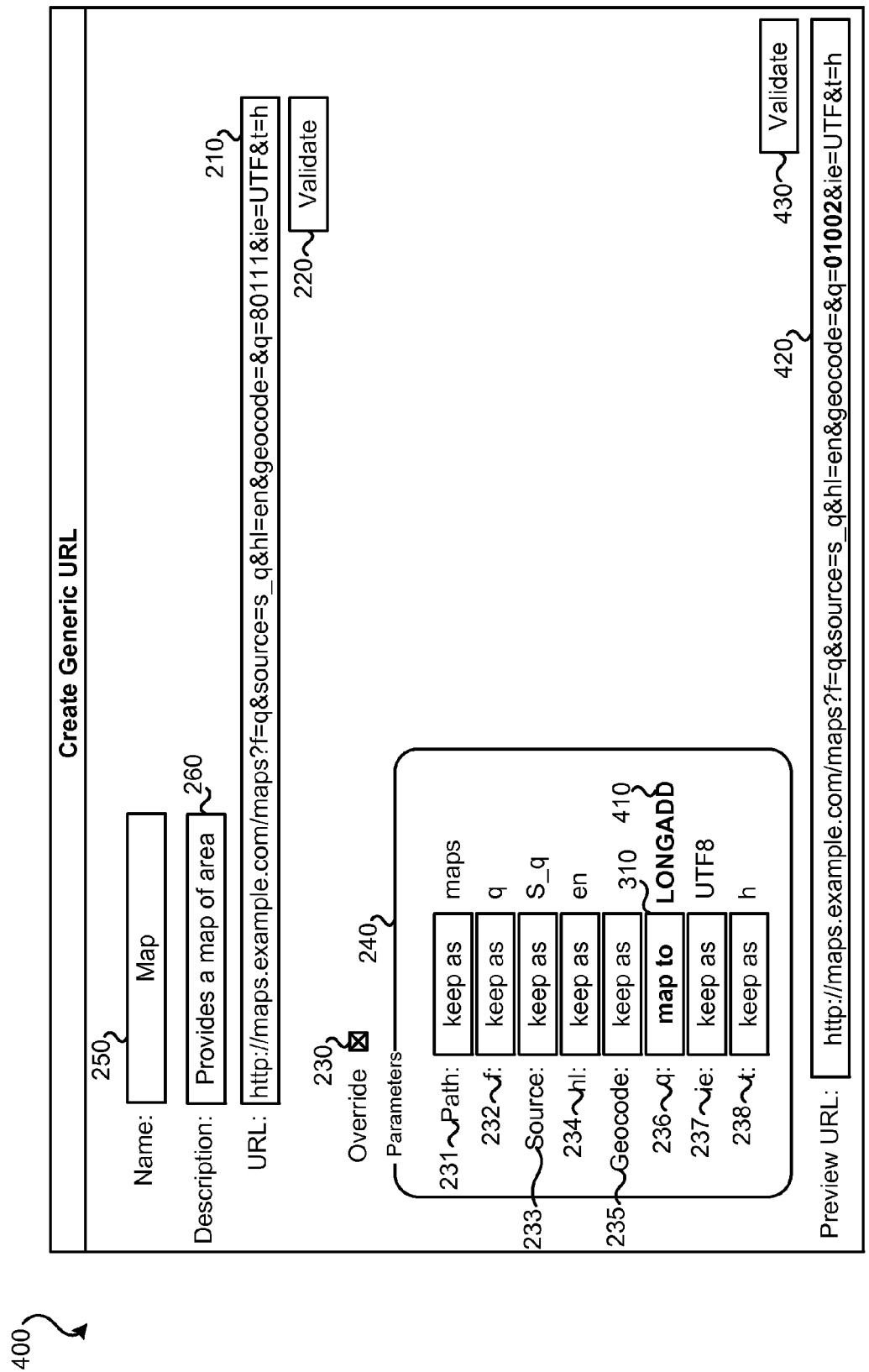
FIG. 4 illustrates another embodiment of an interface for creating a generic universal resource indicator.

FIG. 4 illustrates another embodiment of an interface 400 for creating a generic universal resource indicator. Interface 400 represents interface 300 following a user selecting a field to map parameter q 236 to. In interface 400, the user has selected a variable 410 called "LONGADD." Variable 410 may be a field present in one or more records of a database. As such, depending on the value of the field corresponding to LONGADD in a particular record, a specific URL can be created using the generic URL to retrieve a resource using information from the particular record.

Preview URL display 420 may illustrate a generic URL created using the URL provided in link input 210 in conjunction with the modified parameters in parameters region 240. As such, in the example of interface 400, because parameter q 236 has been mapped to variable 410 LONGADD, the value of q in preview URL display 420 is replaced with the value of LONGADD (which, in the example of FIG. 4, is illustrated as 01002). Validate input 430 may allow a user to determine whether the generic URL is expected to be functional. Selecting validate input 430 may result in a determination of whether the resource linked with the generic URL contains a frame breaker. Also, the URL may be loaded for various values of, in this case, LONGADD to determine whether modifying the value of the parameter q 236 yields valid URLs.

Figure 5:
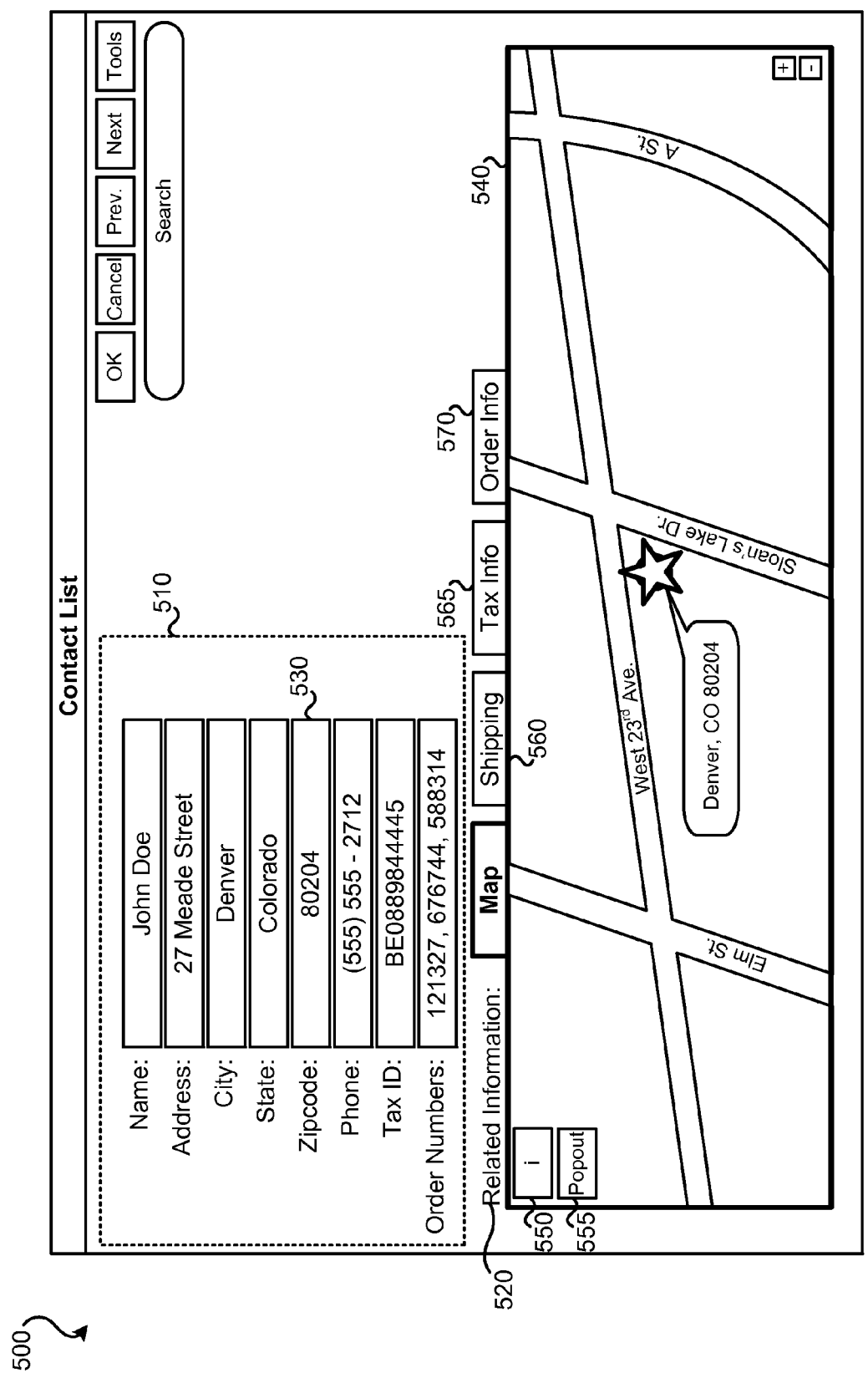
FIG. 5 illustrates an embodiment of an interface for using a generic universal resource indicator.

Once a generic URI or URL has been created, the generic URL may be used in conjunction with database records to contextualize a resource for the loaded (e.g., displayed) record. FIG. 5 illustrates an embodiment of an interface 500 for using a generic URL to retrieve a resource contextualized for a record of a database. Interface 500 illustrates an embodiment of a record from an electronic contact list. This contact list may be hosted by an application server system and accessed by an end user computer. Interface 500 may be accessed via ERP software. In the embodiment of interface 500, address information 510 may represent biographical information for a particular entity, such as a supplier. In this embodiment, the name, address, city, state, zip code, phone number, tax identification, and order numbers are listed in each record. Referring to FIG. 1, this record of the electronic contact list may represent a record of database 150. While interface 500 only illustrates one record, many hundreds or thousands of other address records may be loaded within interface 500.

Toolbar 520, entitled "Related Information," may provide a user with access to resources that have been retrieved using generic URL's. Referring back to FIG. 4, a generic URL was created having a generic parameter "LONGADD" as the "q" parameter of the URL provided in link input 210 that is linked with the corresponding record fields serving as the variable. The generic URL presented in preview URL display 420 may be used to create the map presented in display window 540 of interface 500. The LONGADD variable is the zip code field of the records of the database. For the record displayed in interface 500, the value present in zip code field 530 is 80204. As such, the value of LONGADD for this record is 80204. Therefore, a URL specific to the displayed record is created using 80204 as the value of LONGADD in the generic URL. In this instance, the URL would be: http://maps.-example-.com/maps?f=q&source=s_q&hl=en&geocode=&q=80204&ie=UTF&t=h. This URL specific to the displayed record is used to request the resource. Attributes of the resource, as retrieved, are contextualized to the displayed record by displaying a map centered on the zip code present in zip code field 530. If zip code field 530 is updated, the URL created from the generic URL may also be updated, resulting in the resource being contextualized to the new URL. Information selector 550 may allow the user to view the link as created from the generic URL and/or may allow the user to view the generic URL. Pop-out selector 555 may allow the user to load the map in a separate window (e.g., not a frame of interface 500).

While map is one selection that may be made from toolbar 520, other generic links may be used to retrieve other resources. For example, some other generic link may be used to load shipping information via tab 560. Tab 565 may load tax information. Tab 570 may load order information. Each of these tabs may be linked with a generic URL (or generic URI) that has one or more parameters that are set to a constant defined by a user and/or are linked to a variable, such as a field of a record that is loaded or displayed. By way of example only, regarding tab 560, parameters of a URL for shipping may use the city, state, zip code, and/or address of the record to determine approximate shipping costs and/or delivery time.

FIGS. 2-4 illustrate various embodiments of interfaces for creating generic URI's and URL's. FIG. 5 illustrates an embodiment to use generic URI's or URL's to retrieve a resource contextualized for a record of a database. It should be understood that each of these interfaces are merely exemplary. The presentation of the various fields, windows, and the use of an electronic contact list are merely exemplary. Similar information may be rearranged, presented over multiple interfaces, or combined with other interfaces. Other forms of databases may be used. In some embodiments, generic URI's and URL's may be used in conjunction with data structures other than records of databases. Further, the use of a generic URL to create a generic link for a map is intended to merely be exemplary. Generic URL's and URI's may be used to retrieve contextualized resources from other sources that use parameters in URL's or URI's.

Figure 6:
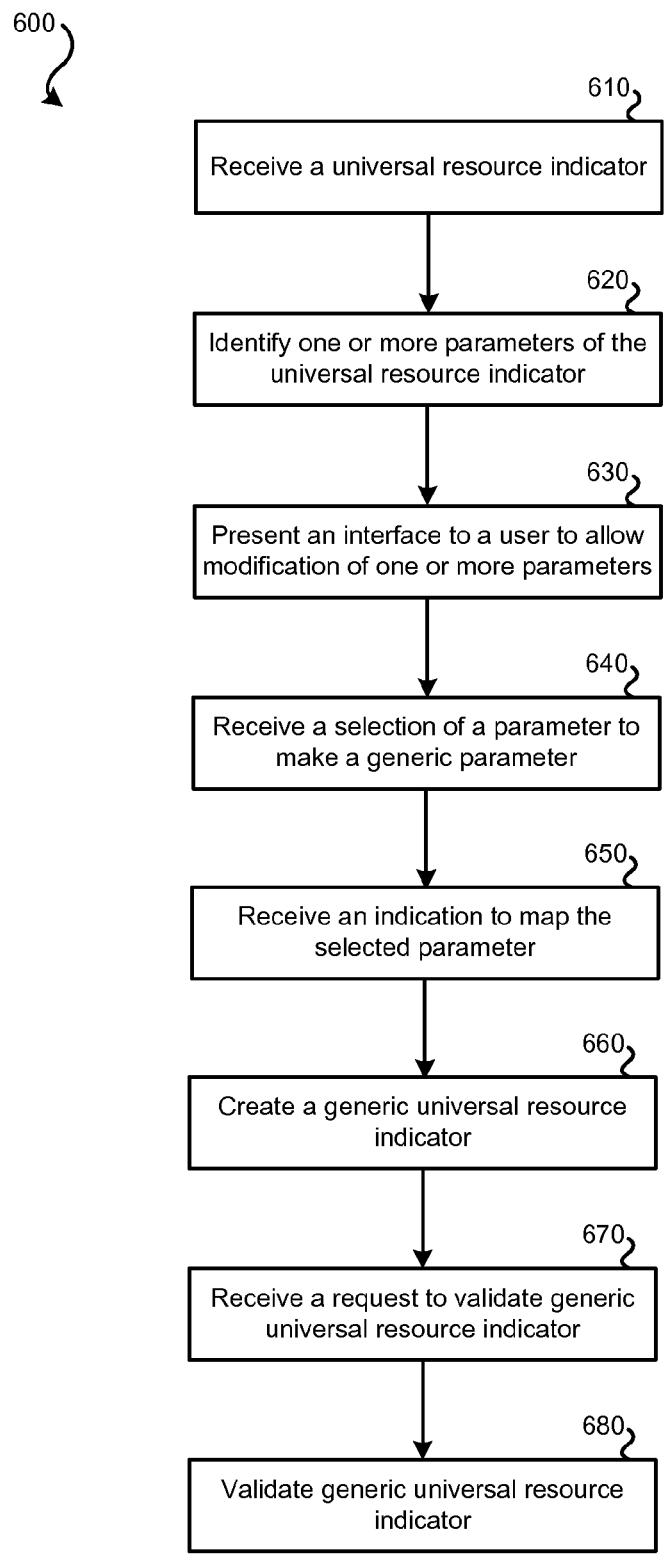
FIG. 6 illustrates an embodiment of a method for creating a generic universal resource indicator.

The systems and interfaces of FIGS. 1-5 may be used to perform various methods. FIG. 6 illustrates an embodiment of a method for creating a generic universal resource indicator. Method 600 may be performed by system 100 of FIG. 1, possibly in conjunction with one or more of the interfaces of FIGS. 1-4. In some embodiments, method 600 may be performed by a system other than system 100 or via the interfaces presented in FIGS. 1-4. Each step of method 600 may be performed by a computer system, such as an end user computer system and/or an application server system of FIG. 1.

At step 610, a universal resource indicator may be received. A universal resource indicator, which may include or be a universal resource locator, may be provided by a user via an interface. For instance, a user may visit a resource, such as a website, that the user desires a generic universal resource indicator for. The user may load a specific webpage at the website. The user may then select and copy the universal resource indicator and provide it to the interface of the computer system performing step 610.

At step 620, one or more parameters present in the universal resource indicator provided at step 610 may be identified. The computer system that has received the universal resource indicator may parse the URI and identify one or more parameters within the URI. Certain rules may be used to determine what portions of the universal resource indicator constitute parameters. For example, characters following an ampersand or question mark but before equals marks may be considered a parameter. Characters following equals marks but before an ampersand may be considered to be a value of a parameter. Another rule may be that characters between forward slashes of a universal resource indicator are parameters. The string after a period before a question mark may be considered a parameter. A string after a backslash but before a question mark or period may be considered a parameter. These rules are merely exemplary; another rule may be the prefixes and postfixes of a file name are parameters; other rules may be used.

At step 630, an interface may be presented to a user to allow for modification of one or more of the parameters. The interface presented at step 630 may be an embodiment of interface 200 of FIG. 2. The interface may permit the user to select one or more parameters that the user wishes to vary from the parameter's original value (as received at step 610). The user may be permitted to set the parameter to a static value (e.g., a set number or some other set string of characters) or linked with a variable. In the instance of a variable, the parameter may be linked by the user with a variable, such as a field present in records of a database or a field being displayed on the form. Other parameters of the URI may be left unchanged.

At step 640, a selection of a parameter present in the universal resource indicator received at step 610 may be received. This parameter may be made a generic parameter by linking with a variable. For example, referring to interface 300 of FIG. 3, a user may select a selector, such as modification selector 310, to indicate that the user wishes to vary the value of a particular parameter. Other ways of a user selecting a parameter are also possible.

At step 650, an indication to map the parameter selected at step 640 may be received. This indication may provide a constant value which the user desires to map to the parameter. As such, all URI's created using the resulting generic universal resource indicator would have the parameter selected at step 640 set to the constant value received at step 650. The indication received at step 650 may instead indicate a variable which the user desires to map to the parameter. The user may indicate a field or some other form of information that the user desires to map to the value of the parameter by selecting a field present within a record. For instance, if the user desires the parameter be mapped to an order number, the user may select one or more fields (to serve as the variable) within a record that indicates order numbers.

If more than one parameter is to be mapped to a constant value (different from the value present in the universal resource indicator received at step 610) or a variable, method 600 may return to step 640 to receive another selection of a parameter. Steps 640 and 650 may repeat for as many of the parameters present in the universal resource indicator provided at step 610 that the user wishes to vary from the original parameter values.

At step 660, a generic universal resource indicator may be created. The generic universal resource indicator may, at least partially, be based on the universal resource indicator received at step 610, the one or more parameters selected at step 640, and the one or more indications of where the selected parameters should be mapped at step 650. As such, if an indication is received at step 650 that a selected parameter is to be mapped to a field of a record (e.g., a control), the generic universal resource indicator created at step 660 may contain a generic parameter that is linked to the appropriate variable (e.g., field of the records within the database). If the indication received at step 650 indicates that the selected parameter is to be mapped to a constant value, the constant value may be set as the value of the parameter within the generic universal resource indicator.

Following the generic universal resource indicator being created at step 660, it may be desirable to validate that the generic universal resource indicator may be used to successfully access contextualized versions of the resource. Validating the generic universal resource indicator may inform the user whether it will be possible for new universal resource indicators to be created from the generic universal resource indicator and/or whether the generic universal resource indicator may be used to create universal resource indicators linked with resources capable of being displayed within a frame of an Internet browser.

At step 670, a request may be received to validate the generic universal resource indicator. At step 680, the generic universal resource indicator may be validated. This may involve the generic universal resource indicator being used to retrieve and load a contextualized version of the resource linked with the generic universal resource indicator. If generic parameters are present within the generic universal resource indicator, values from the corresponding variable (e.g., field of a record) may be used. For instance, values from a selected record may be used for validation. In some embodiments, values from a random record within the database may be used. The retrieved resource may be displayed to the user or may be evaluated for loading correctly without requiring viewing by the user. Also, the resource retrieved using the generic universal resource indicator may be evaluated to determine if a Java script frame breaker is present within the code of the retrieved resource. If the generic universal resource indicator was intended to be used to retrieve contextualized versions of a resource to be displayed within a frame of a web browser, the presence of a frame breaker may prevent the resource from being displayed as such. If a frame breaker is present, validation may fail. Upon such a fail, the user may be informed that a frame breaker is present in the resource.

Figure 7:
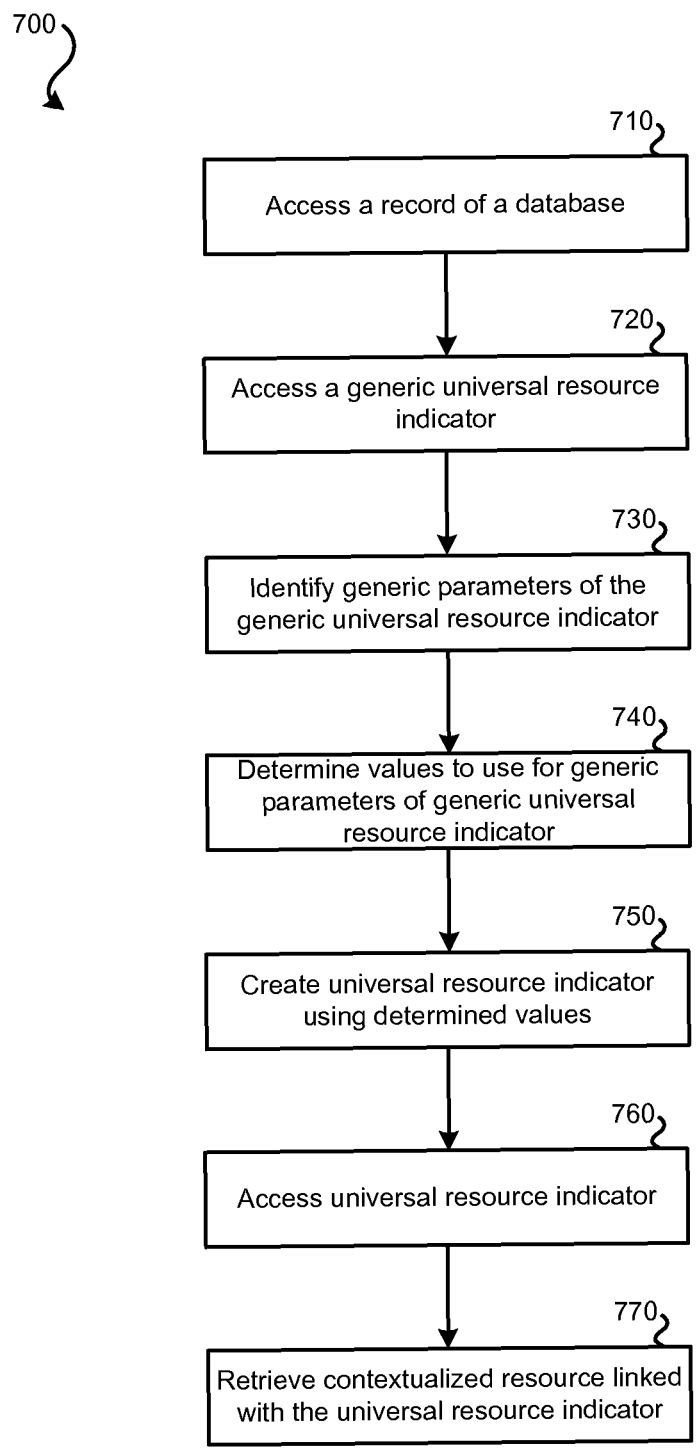
FIG. 7 illustrates an embodiment of a method for using a generic universal resource indicator.

While method 600 is generally directed to the creation of a generic universal resource indicator, other methods may be generally directed to using such generic URI's to retrieve a resource with contextualized attributes. FIG. 7 illustrates an embodiment of a method 700 for using a generic universal resource indicator to retrieve a resource with contextualized attributes. Method 700 may be performed by one or more computer system, such as an end user computer system or application server system of system 100 of FIG. 1.

At step 710, a record of a database may be accessed. For instance, a user may be accessing records via software, such as ERP software. It should be understood that records in the database are only one possible version of stored information that may be accessed. Information may be accessed that is stored in other forms of data structures. Within the record of the database, one or more generic universal resource indicators (such as generic URL's) may be present. In some embodiments, rather than the generic universal resource indicator being stored within the record, a pointer or other form of link to a generic universal resource indicator is present. At step 720, the general universal resource indicator may be accessed. For example, whenever a record of the databases is accessed at step 710, one or more associated generic universal resource indicators may also be accessed. When a generic universal resource indicator is accessed, a contextualized version of the resource associated with the generic universal resource indicator may be retrieved.

At step 730, one or more generic parameters present in the generic universal resource indicator may be identified. The generic parameters identified may be linked with one or more variables. Within the generic universal resource indicator, one or more flags, or some other form of indicator, may identify which parameters are generic parameters and/or which parameters are to remain static. At step 740, values to use for such generic parameters of the generic universal resource indicator may be determined. For example, if a generic parameter corresponds to a field (which is serving as the variable) of the record of the database accessed at step 710, the value present within the field of the record may be used for the value of the variable.

At step 750, a universal resource indicator may be created using the generic universal resource indicator accessed at step 720 and the values determined at step 740. As such, at step 750, the generic universal resource indicator has been used to create a universal resource indicator with parameters that are contextualized to the record accessed at step 710. At step 760, the universal resource indicator created at step 750 may be used to access the resource. For example, if the resource is a website, the universal resource indicator may be used to retrieve and display a webpage of the website to a user. At step 770, the resource is retrieved. As retrieved, one or more attributes of the resource may be contextualized based on the values of the parameters. As such, the values determined at step 740 used in conjunction with the generic universal resource indicator may result in the resource that is retrieved at step 770 having one or more attributes that are contextualized for the record accessed at step 710.

For example, consider again a generic universal resource indicator having a generic parameter for a zip code that is linked with a variable. The variable may be a field present in records of a database. At step 710, the user may access the database (such as in the form of a contact list) that contains vendor addresses. The user may access a particular record that identifies information, including a zip code, for a vendor. By accessing this record, the user may also access a particular generic universal resource indicator. If a generic parameter is present within the generic universal resource indicator, a value for the variable linked with the generic parameter may be identified. If the variable is a field within the record that identifies the vendor's zip code, the zip code from that vendor's record may be inserted into the generic universal resource indicator to create a universal resource indicator. This universal resource indicator may be used to access the resource. The resource having attributes contextualized for the record of the vendor may be retrieved and displayed using this universal resource indicator. In this instance, a map of the area in the vicinity of the zip code may be displayed.

Figure 8:
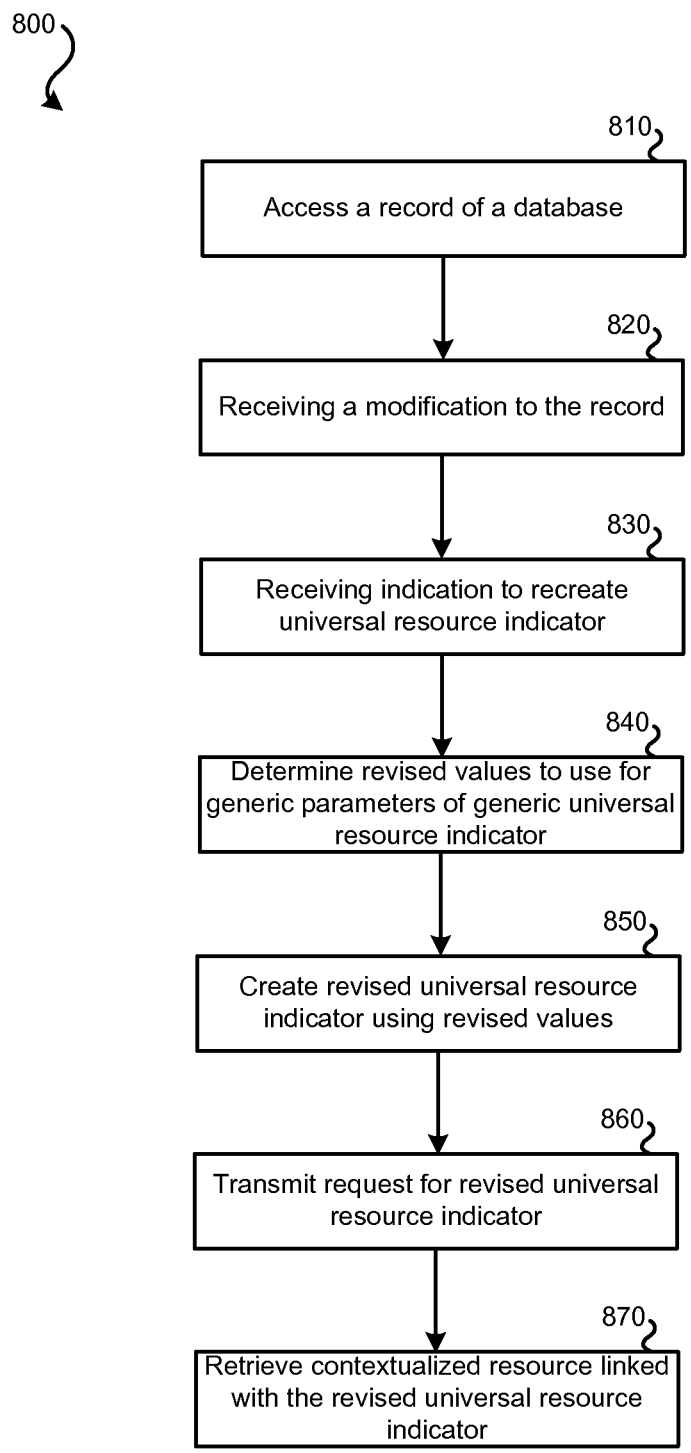
FIG. 8 illustrates an embodiment of a method for modifying a record linked with a universal resource indicator created using a generic universal resource indicator.

After a universal resource indicator has been created from a generic universal resource indicator, the value of the variable linked with the generic parameter in the generic universal resource indicator may change. For example, if the universal resource indicator is linked with a record of a database, information present in the record may be modified. As such, the universal resource indicator may need to be recreated in order to account for the modified record. FIG. 8 illustrates an embodiment of a method for modifying a record linked with a universal resource indicator created using a generic universal resource indicator. Embodiments of method 800 may be performed by a computer system, such as an end user computer system of end user computer systems 130 of FIG. 1 and/or application server system 110.

At step 810, a record of a database may be accessed. While the remainder of the embodiment of method 800 is described in relation to a record of a database being modified, some embodiments may relate to some other form of stored information being modified. At step 820, a modification to the record may be received. One or more fields within the record may be edited. For example, if the record being accessed is an entry in a contact list for an entity, the zip code may be edited. As such, if the zip code has been edited (e.g., the entity has relocated to a new city), information displayed along with the record may need to be updated in order to account for the change in zip code and/or other changes to the record.

At step 830, an indication may be received to recreate a universal resource indication from a generic URI that takes into account the one or more modifications received at step 820. In some embodiments, a user may provide an input that indicates that the URI should be recreated. In some embodiments, when information within a record is modified, corresponding URI's are automatically recreated.

At step 840, revised values may be determined for generic parameters of the generic universe resource indicator. If the fields of the record modified at step 820 do not result in changes to any fields that linked with a generic parameter of the generic URI, the URI created using the generic URI and the record may remain unchanged. As such, some embodiments of method 800 may cease at step 840. If one or more generic parameters of the generic URI are linked with a field (the variable) of the record that has been modified, a recreated URI may have one or more different parameters. One or more fields of the record that are mapped with generic parameters of the generic URI may be accessed. Using the content of these fields, revised values for the generic parameters may be determined.

At step 850, a revised universal resource indicator may be created using the revised values determined at step 840. If the modifications to the record result in no changes to fields linked with a generic parameter of the generic URI, then the recreated URI may be the same as the URI created before the modifications were received. Creation of the revised URI using the revised values may proceed similarly to the creation of the initial URI: the generic URI may be used in conjunction with the (revised) values determined at step 840.

At step 860, the revised URI may be used to request the resource. A request for the revised URI may be transmitted. At step 870, the resource may be received. The resource may be contextualized based on the revised URI. As such, one or more attributes of the resource may be contextualized based on the parameters of the revised URI.

The following represents an example of method 800 involving modification of a record within a contact list. A business organization may be listed within a contact list. The contact list may contain the address and/or other contact information for the business organization. For example, the business organization's zip code may currently be listed as 80204. Currently, if a user accesses the record of the contact list corresponding to the business organization, a map of this zip code (e.g., where the business organization is headquartered) is displayed. The map may be retrieved by accessing a link such as: "http://maps.example.com/maps?f=q&source=s_q&hl=en&geocode=&q=80204&ie=UTF&t=h." This URI may have been previously created from a generic URI that has a generic parameter linked with a field present in records of the contact list. The generic URI may appear as: "http://maps.example.com/maps?f=q&source=s_q&hl=en&geocode=&q=ZIPCODEFIELD&ie=UTF&t=h." Since the business organization has relocated its headquarters to zip code 01852, the business organization's entry within the contact list may be modified to reflect the new location of the headquarters.

At step 810, the business organization's record may be accessed by a user to update the business organization's address. At step 820, the user may input the business organization's new address, including a new zip code (01852). At step 830, the user may provide an input (such as by clicking a button) that indicates the URI that is used to retrieve the map of the business organization's zip code is to be recreated. At step 840, using the fields of the business organization's record as modified at step 820, revised values are determined for the generic parameters of the generic URI that is used to create URI's to retrieve maps of zip codes. In this instance, the generic URI used to create URI's to retrieve maps has one generic parameter that is linked with a field of various records (this field serving as the variable): the zip code parameter. As such, this generic parameter is linked with the value of the business organization's new zip code, 01852. At step 850, a URI may be created for the business organization's record, as modified, based on the generic URI and the modified values of the record. This link may appear as: "http://maps.example.com/-maps?f=q&source=s_q&hl=en&geocode=&q=01852&ie=UTF&t=h." At step 860, the recreated URI may be used to request the resource, in this case, a map of the business organization's new zip code. At step 870, a map (the resource) may be returned that is centered on the new zip code of 01852 identified via parameters in the business organization's modified record of the contact list.

Figure 9:
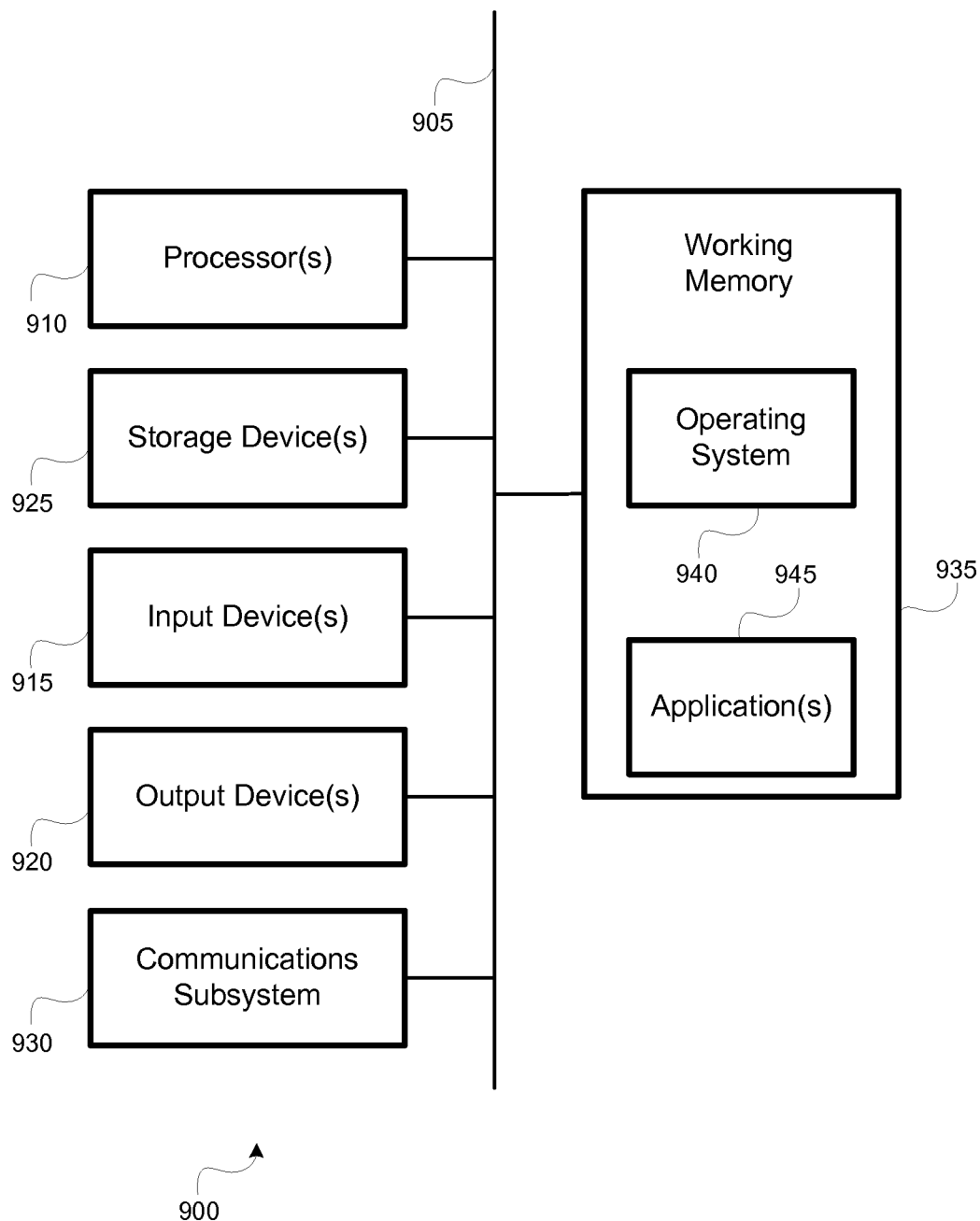
FIG. 9 illustrates an embodiment of a computer system.

FIG. 9 illustrates an embodiment of a computer system. A computer system as illustrated in FIG. 9 may incorporate as part of the previously described computerized devices. FIG. 9 provides a schematic illustration of one embodiment of a computer system 900 that can perform the methods provided by various other embodiments, as described herein, and/or can function as the end user computer systems 130, application server system 110, and/or third party resources 140 of FIG. 1. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 902.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various steps may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for creating a generic universal resource indicator, the method comprising:
   receiving, by a computer system, a universal resource indicator, via a generic universal resource user interface;
   parsing, by the computer system, the universal resource indicator to identify one or more parameters, wherein the parsing comprises using rules to determine what portions of the universal resource indicator constitute parameters;
   causing, by the computer system, the generic universal resource user interface to be presented that permits each of the one or more parameters to be selected and mapped to a variable;
   receiving, by the computer system, a selection of a first parameter to be mapped;
   receiving, by the computer system, an indication of a first variable to map to the first parameter of the selection, wherein a value for the first variable is configured to vary based on a first data field of a record accessed from a plurality of records of a database;
   creating, by the computer system, a generic universal resource indicator having a generic parameter corresponding to the first parameter of the selection, wherein the generic parameter is mapped to the first variable;
   validating the generic universal resource indicator by:
      retrieving multiple potential values for the first variable by accessing the first data field for multiple records in the database;
      creating a plurality of specific universal resource indicators, wherein each specific universal resource indicator is created using the generic universal resource indicator and one of the multiple potential values for the first variable; and
      determining whether each of the plurality of specific universal resource indicators corresponds to a valid universal resource locator; and
   causing, by the computer system, via a preview universal resource indicator display of the generic universal resource user interface, the generic universal resource indicator having the generic parameter to be presented.

2. The method for creating the generic universal resource indicator of claim 1, wherein:
   the one or more parameters are a plurality of parameters; and
   creating, by the computer system, the generic universal resource indicator having the first parameter of the selection mapped to the first variable comprises maintaining as static parameters of the plurality of parameters not indicated by the selection in the generic universal resource indicator.

3. The method for creating the generic universal resource indicator of claim 1, wherein the first variable is linked with a field present in each record of a plurality of records present in a database.

4. The method for creating the generic universal resource indicator of claim 1, further comprising:
   receiving, by the computer system, a request to validate the generic universal resource indicator; and
   validating, by the computer system, the generic universal resource indicator at least in part by determining whether a resource identified by the generic universal resource indicator contains a frame breaker.

5. The method for creating the generic universal resource indicator of claim 1, further comprising:
   receiving, by the computer system, an override, wherein the override triggers the interface to be presented.

6. A system for creating a generic universal resource indicator, the system comprising:
   a processor; and
   a memory communicatively coupled with and readable by the processor and having stored therein a series of instructions which, when executed by the processor, cause the processor to:
      receive a universal resource indicator via a generic universal resource user interface;
      parse the universal resource indicator to identify one or more parameters of the universal resource indicator, wherein the parsing comprises using rules to determine what portions of the universal resource indicator constitute parameters;
      cause an interface to be displayed that permits each of the one or more parameters to be selected and mapped to a variable;
      cause a selection to be received of a first parameter to be mapped;
      cause an indication to be received of a first variable to map to the first parameter of the selection, wherein a value for the first variable is configured to vary based on a first data field of a record accessed from a plurality of records of a database;
      create a generic universal resource indicator having a generic parameter corresponding to the first parameter of the selection, wherein the generic parameter is mapped to the first variable;
      validate the generic universal resource indicator by:
         retrieving multiple potential values for the first variable by accessing the first data field for multiple records in the database;
         creating a plurality of specific universal resource indicators, wherein each specific universal resource indicator is created using the generic universal resource indicator and one of the multiple potential values for the first variable; and
         determining whether each of the plurality of specific universal resource indicators corresponds to a valid universal resource locator; and
      cause, via a preview universal resource indicator display of the generic universal resource user interface, the generic universal resource indicator having the generic parameter to be presented.

7. The system for creating the generic universal resource indicator of claim 6, wherein a context of a resource identified by the generic universal resource indicator, as accessed using the generic universal resource indicator, varies at least partially based on a value of the first variable mapped to the generic universal resource indicator.

8. The system for creating the generic universal resource indicator of claim 6, wherein the first variable is linked with a field present in each record of a plurality of records present in a database.

9. The system for creating the generic universal resource indicator of claim 6, wherein the series of instructions further comprise instructions that cause the processor to:
   cause a request to be received to validate the generic universal resource indicator; and
   validate the generic universal resource indicator at least in part by determining whether a resource identified by the generic universal resource indicator contains a frame breaker.

10. The method for creating the generic universal resource indicator of claim 1, wherein:

causing the generic universal resource user interface to be presented comprises causing a second parameter of the universal resource indicator to be presented; and the method further comprising:
receiving, by the computer system, an indication of a constant value to map to the second parameter; and
creating, by the computer system, the generic universal resource indicator having the second parameter mapped to the constant value.

11. The method for creating the generic universal resource indicator of claim 1, wherein the generic universal resource user interface permits each of the one or more parameters to be selected and mapped to a variable or mapped to a static value.

12. A method for creating a generic universal resource indicator, the method comprising:
receiving, by a computer system, a universal resource indicator, via a generic universal resource user interface;
parsing, by the computer system, the universal resource indicator to identify one or more parameters, wherein the parsing comprises using rules to determine what portions of the universal resource indicator constitute parameters;
causing, by the computer system, the generic universal resource user interface to be presented that permits each of the one or more parameters to be selected and mapped to a variable;
receiving, by the computer system, a selection of a first parameter to be mapped;
receiving, by the computer system, an indication of a first variable to map to the first parameter of the selection, wherein a value for the first variable is configured to vary based on a first data field of a record accessed from a plurality of records of a database;
creating, by the computer system, a generic universal resource indicator having a generic parameter corresponding to the first parameter of the selection, wherein the generic parameter is mapped to the first variable;
validating the generic universal resource indicator by:
selecting one or more random records from the database;
retrieving the first data field from each of the one or more randomly selected records;
creating a specific universal resource indicator corresponding to each of the randomly selected records; and
attempting to retrieve and load a resource corresponding to each of the specific universal resource indicators; and
causing, by the computer system, via a preview universal resource indicator display of the generic universal resource user interface, the generic universal resource indicator having the generic parameter to be presented.

13. The method for creating the generic universal resource indicator of claim 12, wherein the first variable is linked with a field present in each record of a plurality of records present in a database.

14. The method for creating the generic universal resource indicator of claim 12, wherein the generic universal resource user interface permits each of the one or more parameters to be selected and mapped to a variable or mapped to a static value.

15. A method for creating a generic universal resource indicator, the method comprising:
receiving, by a computer system, a universal resource indicator, via a generic universal resource user interface;
parsing, by the computer system, the universal resource indicator to identify one or more parameters, wherein the parsing comprises using rules to determine what portions of the universal resource indicator constitute parameters;
causing, by the computer system, the generic universal resource user interface to be presented that permits each of the one or more parameters to be selected and mapped to a variable;
receiving, by the computer system, a selection of a first parameter to be mapped;
receiving, by the computer system, an indication of a first variable to map to the first parameter of the selection, wherein a value for the first variable is configured to vary based on a first data field of a record accessed from a plurality of records of a database;
creating, by the computer system, a generic universal resource indicator having a generic parameter corresponding to the first parameter of the selection, wherein the generic parameter is mapped to the first variable;
causing, by the computer system, via a preview universal resource indicator display of the generic universal resource user interface, the generic universal resource indicator having the generic parameter to be presented;
retrieving a first value from the first data field for a first record in the database;
creating a specific universal resource indicator based on the generic universal resource indicator and the first value;
upon receiving an indication that the first record in the database has been updated, retrieving an updated first value from the first data field for the first record in the database; and
creating an updated specific universal resource indicator based on the generic universal resource indicator and the updated first value.

16. The method for creating the generic universal resource indicator of claim 15, wherein the first variable is linked with a field present in each record of a plurality of records present in a database.

17. The method for creating the generic universal resource indicator of claim 15, wherein the generic universal resource user interface permits each of the one or more parameters to be selected and mapped to a variable or mapped to a static value.

18. A system for creating a generic universal resource indicator, the system comprising:
a processor; and
a memory communicatively coupled with and readable by the processor and having stored therein a series of instructions which, when executed by the processor, cause the processor to:
receive a universal resource indicator via a generic universal resource user interface;
parse the universal resource indicator to identify one or more parameters of the universal resource indicator, wherein the parsing comprises using rules to determine what portions of the universal resource indicator constitute parameters;
cause an interface to be displayed that permits each of the one or more parameters to be selected and mapped to a variable;
cause a selection to be received of a first parameter to be mapped;
cause an indication to be received of a first variable to map to the first parameter of the selection, wherein a value for the first variable is configured to vary based on a first data field of a record accessed from a plurality of records of a database;

create a generic universal resource indicator having a generic parameter corresponding to the first parameter of the selection, wherein the generic parameter is mapped to the first variable;
validate the generic universal resource indicator by:
selecting one or more random records from the database;
retrieving the first data field from each of the one or more randomly selected records;
creating a specific universal resource indicator corresponding to each of the randomly selected records; and
attempting to retrieve and load a resource corresponding to each of the specific universal resource indicators; and
cause, via a preview universal resource indicator display of the generic universal resource user interface, the generic universal resource indicator having the generic parameter to be presented.

19. The system for creating the generic universal resource indicator of claim 18, wherein the first variable is linked with a field present in each record of a plurality of records present in a database.

20. The system for creating the generic universal resource indicator of claim 18, wherein the generic universal resource user interface permits each of the one or more parameters to be selected and mapped to a variable or mapped to a static value.

21. A system for creating a generic universal resource indicator, the system comprising:
a processor; and
a memory communicatively coupled with and readable by the processor and having stored therein a series of instructions which, when executed by the processor, cause the processor to:
receive a universal resource indicator via a generic universal resource user interface;
parse the universal resource indicator to identify one or more parameters of the universal resource indicator, wherein the parsing comprises using rules to determine what portions of the universal resource indicator constitute parameters;
cause an interface to be displayed that permits each of the one or more parameters to be selected and mapped to a variable;
cause a selection to be received of a first parameter to be mapped;
cause an indication to be received of a first variable to map to the first parameter of the selection, wherein a value for the first variable is configured to vary based on a first data field of a record accessed from a plurality of records of a database;
create a generic universal resource indicator having a generic parameter corresponding to the first parameter of the selection, wherein the generic parameter is mapped to the first variable;
cause, via a preview universal resource indicator display of the generic universal resource user interface, the generic universal resource indicator having the generic parameter to be presented;
retrieve a first value from the first data field for a first record in the database;
create a specific universal resource indicator based on the generic universal resource indicator and the first value;
upon receiving an indication that the first record in the database has been updated, retrieve an updated first value from the first data field for the first record in the database; and
create an updated specific universal resource indicator based on the generic universal resource indicator and the updated first value.

22. The system for creating the generic universal resource indicator of claim 21, wherein the first variable is linked with a field present in each record of a plurality of records present in a database.

23. The system for creating the generic universal resource indicator of claim 21, wherein the generic universal resource user interface permits each of the one or more parameters to be selected and mapped to a variable or mapped to a static value.

\* \* \* \* \*